May 19, 1970     A. L. EHE     3,512,458
METHOD OF MAKING AN ADHESIVELY JOINED ARTICLE HOLDING TRAY
Filed June 14, 1968     3 Sheets-Sheet 1
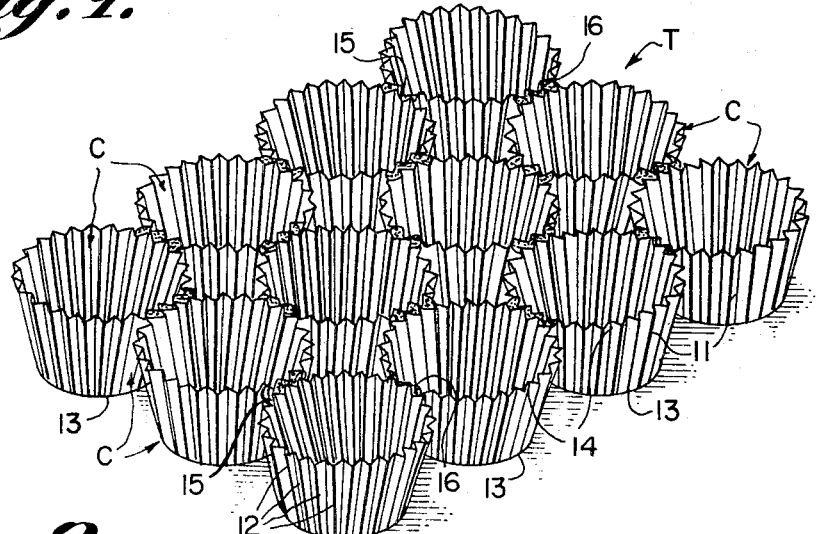
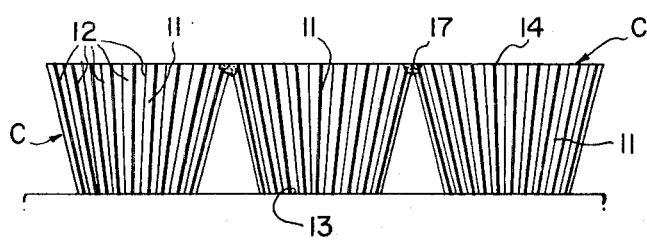
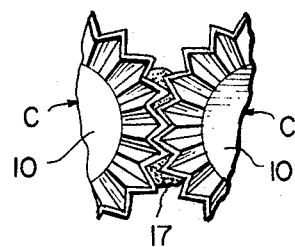
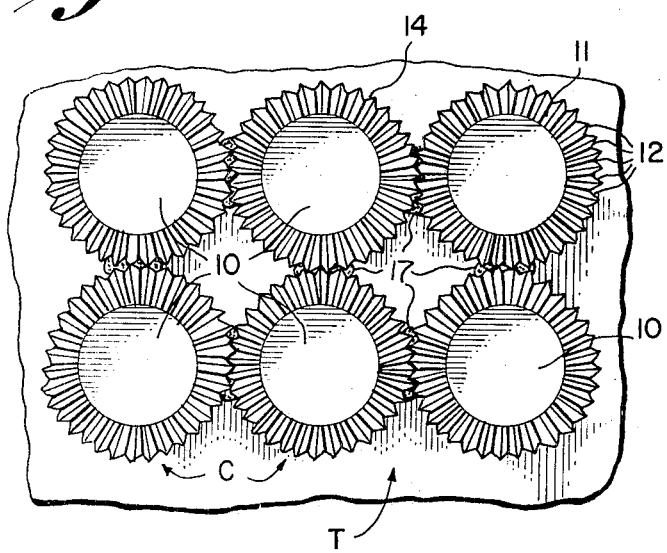
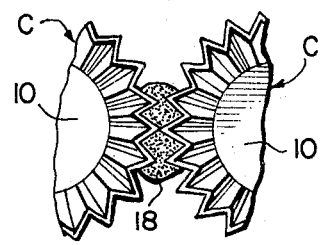
INVENTOR
ALBERT L. EHE
BY Eric P. Schellin
ATTORNEY

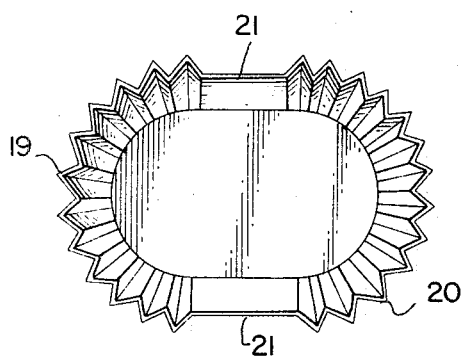
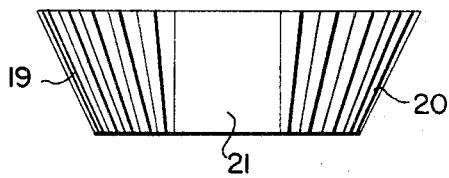
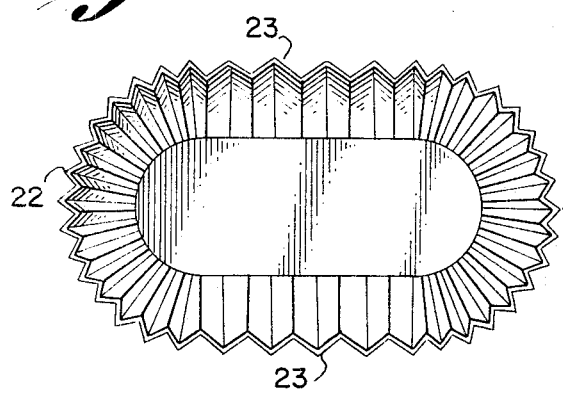
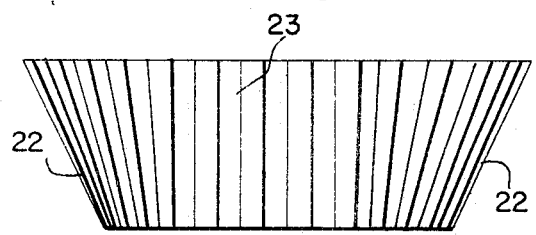
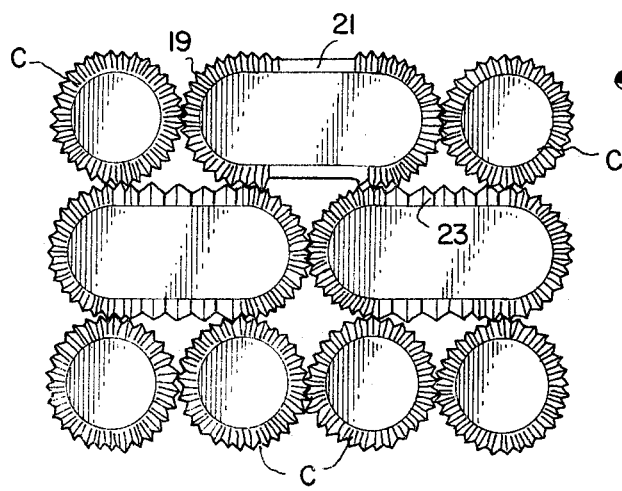

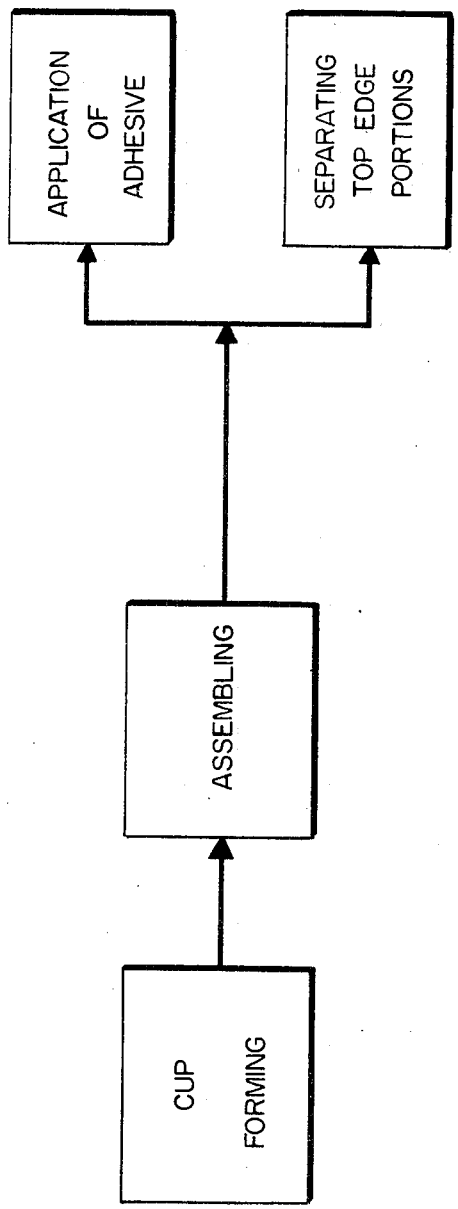

United States Patent Office 3,512,458
Patented May 19, 1970

3,512,458
METHOD OF MAKING AN ADHESIVELY
JOINED ARTICLE HOLDING TRAY
Albert L. Ehe, Jamaica Estates, N.Y., assignor to Multi-cup Automation Company, Inc., a corporation of New York
Filed June 14, 1968, Ser. No. 737,035
Int. Cl. B31b *11/26, 1/62, 49/02*
U.S. Cl. 93—37                     3 Claims

ABSTRACT OF THE DISCLOSURE

This specification discloses an article holding compartmented tray, the individual elements of which are preferably intended for the depositing of pieces of food, such as confections, baked goods and candy therein. The tray comprises a plurality of cups of a suitable material, each having a corrugated wall. When assembled the upper edge of each wall abuts or engages the corresponding edge portions of adjacent cups. An adhesive is supplied between engaging edge portions to maintain the assembled relation until the food item has been deposited therein.

---

The present invention relates to the cups now widely used in the candy and comparable food industries and is concerned primarily with the assembly of a plurality of such cups into a tray-like formation to accommodate filling the cups on a mass production basis.

The practice of providing a cup for each piece of candy, or similar food item, is now widespread if not universal throughout the particular industry. The application of such a cup to a food piece, or the depositing of a piece therein, is a costly labor expense item. It has been proposed to form a plurality of cups in an integrally connected tray-like formation. An example of this is the patent to Ehe (present applicant) No. 3,125,275, dated Mar. 17, 1964.

Such an arrangement is a decided improvement over the existing prior art, particularly in reducing labor costs. However, in the known trays of this type, the cups are integrally joined. This invention is founded on the belief that a better tray will result if the cups are first individually formed and then, subsequent to their formation, assembled in the tray-like structure. This belief is strengthened when it is considered that each cup has a crinkled or corrugated wall and, in accordance with known precedents must be drawn from a single sheet of paper.

With these conditions in mind, the invention has, as an important object, the provision of a tray comprising a plurality of cups arranged in orderly formation and adhesively secured together.

More in detail a further object is to provide a tray of the character aforesaid in which each cup includes an upwardly flaring wall that is corrugated to provide a crinkled construction. The term "corrugated" is intended to embrace flutes, pleats, crimps and corrugations.

When the cups are arranged in an orderly manner such as a plurality of rows, each having the same number of cups, a rectangular tray is provided. In such a tray each corner cup is secured to two adjacent cups, each cup in outside rows with the exception of the corner cups to three adjacent cups, and each of the remainder to four cups. This results in a secure tray structure.

Another important objective is to provide, in a tray of the type noted, cup joining connections each of which comprises engaging edge portions of adjacent cups with an adhesive such as glue securing them together.

Still another object is to provide, in a cup connection of the nature aforesaid in which the corrugations of one cup are in confrontations with the corrugations of adjacent cups, including an initial interfit thereof.

Still another highly important object of this invention is to provide an effective and practical method of assembling a plurality of corrugated cups in a tray-like formation.

This end is achieved by first forming the individual cups, then assembling the cups into a desired tray shape with the corrugations of each cup interfitting with the corrugations of engaging cups, and finally applying an adhesive between engaging edges at the same time separating said engaging edges.

Various other more detailed objects and advantages of the invention, such as arise in conjunction with the carrying out of the above-noted ideas in a practical embodiment, will in part become apparent, and in part be hereinafter stated as the description of the invention proceeds.

For a full and more complete understanding of the invention, reference may be had to the following description and accompanying drawings, wherein:

FIG. 1 is a perspective of a tray constructed in accordance with the precepts of this invention;

FIG. 2 is an end elevation of the tray illustrated in FIG. 1;

FIG. 3 is a fragmentary top plan view;

FIG. 4 is a detail, taken as a top plan of the condition which obtains in a connection between two cups with the corrugations intermeshing and the glue applied;

FIG. 5 is a detailed top plan, similar to FIG. 4, depicting the condition which obtains when the corrugations do not interfit;

FIG. 6 is a top plan view of a modified form of cup which may be included in a tray structure;

FIG. 7 is a side elevation of the cup depicted in FIG. 6;

FIG. 8 is a plan of still another modified form of cup;

FIG. 9 is a side elevation of the cup of FIG. 8;

FIG. 10 is a top plan of a tray including cups of different structural characteristics; and FIG. 11 is a block diagram of the method.

Referring now to the drawings wherein like reference characters denote corresponding parts, and first more particularly to FIG. 1, a tray of this invention is therein illustrated and identified in its entirety by the reference character T.

The tray T comprises a plurality of cups C arranged in a desired number of rows with each row containing the same number of cups as the other rows. In the embodiment illustrated in the drawing, there are three rows of four each but these particular numbers are not intended as a limitation on the invention as both numbers may be varied without departing from the spirit of the invention. The cups C may be of paper, treated paper such as wax paper, glassine, plastic, metal foil, or any material conventionally used in conjunction with items to be insulated from one another.

Each cup C generally comprises a circular bottom 10 (FIG. 3) which ordinarily is flat and an upwardly flaring conical wall 11 integrally joined thereto. The wall 11 is formed with corrugations 12 which extend from the line 13 of joinder with the bottom 10 to an upper free edge 14 of the wall 11. As mentioned above, corrugations are intended to embrace pleats, flutes and crimps.

The cups are first assembled into the rectangular formation illustrated in which the top edge 14 of each corner cup engages the top edge 14 of the two adjacent cups as indicated at 15 and 16. The upper edge 14 of each cup on the outside of the tray, with the exception of the corner cups, engages the three adjacent cups at three places and the innermost or remaining cups engage adjacent cups at four places.

As all of the connections between engaging cup edges 14 are alike, they are all identified by the reference character 17. FIG. 4 depicts the full interfit between the corrugations at the upper edge 14 prior to application of the adhesive. This interfit is normally maintained after the glue is applied.

In some instances, the corrugations will only partially interlock, or perhaps not at all. This arrangement is illustrated in FIG. 5 with the glue being shown at 18. This application of the glue 18 entails a slight separation of the engaging edge portions but this separation is accommodated by the flexible and elastic nature of the paper walls 11.

FIG. 6 illustrates a modification in which the cup is somewhat oblong comprising corrugated rounded end portions 19 and 20 and plain or uncorrugated sides 21.

FIG. 8 depicts still another embodiment which is generally oval. In this form, end portions 22 are rounded with the corrugations or flutes being only partially opened. These corrugations are present in the sides 23 but are more fully opened or distended.

FIG. 10 shows how a composite tray T' may be formed of cups of different shapes as described above. Thus, there are some cups C which are circular, some which take the form of FIG. 6 and others of the type of FIG. 7.

While preferred specific embodiments of the invention are hereinbefore set forth, it is to be clearly understood that the invention is not to be limited to the exact construction, devices and steps illustrated and described, because various modifications of these details may be provided in putting the invention into practice within the purview of the appended claims.

What is claimed is:

1. In the production of cup trays, the method comprising the steps of: first forming a supply of individual cups of relatively thin deformable material each having in at least a portion thereof an upwardly flaring corrugated wall terminating in a top edge, assembling a desired number of said individual cups in a desired formation in which top edge portions of each cup engage top edge portions of adjacent cups with an intermeshing of the corrugations of the top edge portion of one cup with the corrugations of the top edge portion of an adjacent cup, and then applying an adhesive between confronting top edge portions at the same time slightly separating the top edge portions to accommodate the adhesive.

2. The method of claim 1 in which the adhesive is glue.

3. The method of claim 1 in which the flaring walls flex to achieve the separation.

References Cited

UNITED STATES PATENTS

| 3,344,580 | 10/1967 | Griner | 53—160 |
|---|---|---|---|
| 436,883 | 9/1890 | Wagandt. | |
| 1,473,387 | 11/1923 | Simmons | 93—60 |
| 1,976,403 | 10/1934 | Kasser. | |
| 3,149,545 | 9/1964 | Ehe | 93—60 |
| 3,199,419 | 8/1965 | Lang | 93—60 |
| 3,244,082 | 4/1966 | Lemelson | 93—37 X |
| 3,256,784 | 6/1966 | Booth | 93—37 |

FOREIGN PATENTS 693,915   9/1964   Canada.

WAYNE A. MORSE, JR., Primary Examiner

U.S. Cl. X.R.

93—1, 35, 36, 60; 113—120